United States Patent Office 3,632,799
Patented Jan. 4, 1972

3,632,799
METHOD FOR POLYMERIZING VINYL CHLORIDE IN THE PRESENCE OF STEREOSPECIFIC CATALYSTS
Rex W. Cochran, George F. Helfrich, Louis D. Hoblit, and Gordon Y. T. Liu, Baton Rouge, La., assignors to The Dow Chemical Company, Midland, Mich.
No Drawing. Filed Nov. 25, 1968, Ser. No. 778,830
Int. Cl. C08f *3/30, 1/04, 1/56*
U.S. Cl. 260—92.8 R                    3 Claims

ABSTRACT OF THE DISCLOSURE

The present invention is directed to an unexpectedly efficient method for the preparation of polyvinyl chloride in the presence of certain Ziegler-type catalysts wherein such catalysts are prepared in the presence of vinyl chloride monomer. More particularly, the present invention calls for separation of the vinyl chloride monomer charge into two essentially equal portions (a) and (b), wherein the transition metal compound constituent of the prescribed catalyst system is admixed with (a) and the organo-metallic compound and complexing agent compound constituents of the catalyst system are admixed with (b); followed by admixture and subsequent polymerization of portions (a) and (b).

---

It is known that highly crystalline polyvinyl chloride having an isotactic structure may be produced by polymerization using stereospecific catalyst systems composed of crystalline halides of transition metals such as violet titanium trichloride and aluminum trialkyl compounds in the presence of certain complexing agents for the organometallic constituent. In this regard British Pat. 834,937 discloses the addition of a mixture of monomer and organometallic constituent. In this rgeard British Pat. 834,-937 discloses the addition of a mixture of monomer and organometallic compound to a complexing agent followed by the addition of a transition metal compound; the addition of a mixture of organometallic compound and transition metal compound to a mixture of monomer, complexing agent and diluent; and the addition of a mixture of organometallic compound and complexing agent to monomer followed by addition of a transition metal compound. It is noted that all of the illustrative examples of such patent require at least 12,000 pounds of transition metal catalyst per million pounds of vinyl chloride.

It has been discovered however, which discovery forms the basis of the present invention, that unexpectedly enhanced rates of polymerization (with resulting lowered catalyst concentration requirements) are produced by a process comprising the polymerization of vinyl chloride monomer by Ziegler-type catalysts wherein the monomer charge is separated into two essentially equal portions (a) and (b) and wherein the transition metal compound constituent of the catalyst system is admixed with (a) and the organometallic compound and complexing agent compound constituents are admixed with (b), followed by subsequent admixture and polymerization of (a) and (b).

By way of comparison with the prior art, as represented by the British Pat. 834,937, the present process requires as little as 200 and often as little as 10 to 20 pounds of transition metal catalyst per million pounds of vinyl chloride monomer to achieve effective polymerization rates.

The prior art further discloses, e.g. in the Belgium Pat. 538,782, that Ziegler-type catalysts prepared in the presence of monomeric alpha-olefins are of a higher efficiency than catalysts prepared in the absence of such monomer. It is recognized by the prior art however, e.g. by British Pat. 834,937 that a great difference exists between the polar vinyl chloride monomer and non-polar monomeric alpha-olefins with respect to the reaction between the monomeric materials and the individual catalyst components, i.e., British Pat. 834,937 discloses that a complexing agent must be present when vinyl chloride monomer is contacted with the Zeigler-type catalysts to prevent undesirable premature reaction between the catalyst components and the vinyl chloride monomer. With such teaching in mind it has been unexpectedly found that improved catalyst efficiency is obtained by utilization of a process wherein one half of the total vinyl chloride monomer is contacted with the transition metal compound constituent of such catalyst sysem, (without the presence of a complexing agent) prior to admixture with the remaining vinyl chloride monomer, organometallic compound and complexing agent.

It is important to note that not every method of preparing the catalyst in the presence of vinyl chloride monomer results in an enhancement of the rate of polymerization, i.e., only the process of the present invention where one half of the monomer charge is first admixed with the transition metal catalyst component and wherein the remaining vinyl chloride monomer is separately admixed with the organometallic component and a complexing agent, followed by a subsequent admixture and polymerization of such monomer charges; provides the unexpectedly enhanced polymerization rates.

The following example, wherein all parts and percentages are to be taken by weight will serve to better illustrate the present invention but is not to be construed as limiting its scope.

EXAMPLE I

Group I—Effect of separating the monomer charge into essentially equal portions followed by the addition of different combinations of catalyst components Experiment 1: (The invention).—Into a first clean, dry, glass polymerization bottle was charged (at a temperature of about 25° C.) 0.16 gram of titanium tetrachloride ($TiCl_4$) and 30 grams of vinyl chloride and the mixture shaken vigorously. Into a second clean, dry, polymerization bottle was added 0.36 gram of triethylaluminum (ATE) and 0.68 ml. of tetrahydrofuran (THF) followed by the addition of 30 grams of vinyl chloride and the mixture also shaken vigorously. The contents of the two polymerization bottles were then combined, and the container sealed and heated with shaking at a temperature of 30° C. for a period of 2¾ hours. At the end of this time the pressure was released and the polymer was removed and weighed. The polymerization rate, defined as the percent of conversion of monomer to polymer per hour of total reaction time, was found to be 1.52.

Experiment 2: (For comparison).—This experiment was carried out as per Experiment 1 with the exception that all of the titanium tetrachloride and triethylaluminum and ½ of the total vinyl chloride charge were sequentially added in one bottle and all of the tetrahydrofuran and the remaining vinyl chloride were added to a second bottle. After combination and reaction at 30° C. for 18 hours, a polymerization rate of 0.0111 was determined.

Experiment 3: (For comparison).—This experiment was carried out as per Experiment 1 with the exception that all of the tetrahydrofuran, titanium tetrachloride and ½ of the total vinyl chloride charge were sequentially added in one bottle and all of the triethylaluminum and the remaining vinyl chloride in a second bottle. After combination and reaction at 30° C. for 18 hours, a polymerization rate of 0.0222 was determined.

Experiment 4: (For comparison).—This experiment was carried out as per Experiment 1 with the exception that ½ of the total charge of tetrahydrofuran, all of the titanium tetrachloride and ½ of the total vinyl chloride charge were sequentially added to one bottle and all of the triethylaluminum and the remaining tetrahydrofuran and vinyl chloride were sequentially added to a second bottle. After combination and reaction at 40° C. for 4¾ hours, a polymerization rate of 0.895 was determined.

Experiment 5: (For comparison).—This experiment was carried out as per Experiment 1 with the exception that all of the tetrahydrofuran and ½ of the total charge of triethylaluminum and vinyl chloride were sequentially added to one bottle and the remaining triethylaluminum, all of the titanium tetrachloride and the remaining vinyl chloride were sequentially added in another bottle. After combination and reaction at 40° C. for 4¾ hours a polymerization rate of 0.21 was observed.

Experiment 6: (For comparison).—This experiment was carried out as per Experiment 1 with the exception that ½ of the total charge of titanium tetrachloride, all of the tetrahydrofuran and ½ of the total charge of vinyl chloride were sequentially added to one bottle and all of the triethylaluminum and the remaining titanium tetrachloride and vinyl chloride were added to a second bottle. After combination and reaction at 40° C. for 20¾ hours a polymerization rate of 0.132 was determined.

Experiment 7: (For comparison).—This experiment was carried out as per Experiment 1 with the exception that all of the triethylaluminum and ⅓ of the total charge of vinyl chloride were sequentially added in a first bottle, all of the titanium tetrachloride and ⅓ of the total charge of vinyl chloride in a second bottle, and all of the tetrahydrofuran and the remaining vinyl chloride in a third bottle. After combination by mixing the contents of the first bottle with the contents of the second bottle followed by admixture with the contents of the third bottle, and reaction at 50° C. for 21 hours, a polymerization rate of 0.0119 was determined.

Experiment 8: (For comparison).—This experiment was carried out as per Experiment 7 with the exception that all of the tetrahydrofuran and ⅓ of the total charge of vinyl chloride were sequentially added in a first bottle, all of the titanium tetrachloride and ⅓ of the total charge of vinyl chloride in a second bottle, and all of the triethylaluminum and the remaining vinyl chloride in a third bottle. After combination in the manner described in Experiment 7 and reaction at 50° C. for 21 hours a polymerization rate of 0.0119 was determined.

Experiment 9: (For comparison).—This experiment was carried out as per Experiment 7, with the exception that all of the triethylaluminum and ⅓ of the total charge of vinyl chloride were sequentially added in a first bottle, all of the tetrahydrofuran and ⅓ of the total charge of vinyl chloride in a second bottle, and all of the titanium tetrachloride and the remaining vinyl chloride in a third bottle. After combination in the manner described in Experiment 7 and reaction at 50° C. for 21 hours, a polymerization rate of 0.0119 was determined.

Group II—Effect of simultaneous mixing of catalyst components with monomer

Experiment 10: (For comparison).—A catalyst system was prepared by the simultaneous addition of 0.36 gram of triethylaluminum, 0.68 ml. of tetrahydrofuran and 0.16 gram of titanium tetrachloride to 60 grams of vinyl chloride. After reaction at 50° C. for 17 hours a polymerization rate of 1.18 was determined.

Group III—Effect of pre-mixing of catalyst components prior to addition to monomer and effects of polymerization temperature upon polymerization rate.

Experiments 11-13. (For comparison).—In each of three separate experiments, three moles of aluminum triethyl were added to a clean, dry, polymerization bottle followed by the addition of 1 mole of titanium trichloride and 8 moles of tetrahydrofuran. Each bottle was capped and individually shaken to insure uniform mixing of the indicated catalyst components. To each bottle was then separately added sufficient vinyl chloride to result in a catalyst concentration of 50 p.p.m. of titanium based on the weight of vinyl chloride monomer. Each bottle was then sealed and heated with shaking for a period of time as set forth in the following Table I. Thereafter, the pressure was released and the polymers were removed and separately weighed to determine the individual rate of polymerization.

The data in Table I illustrates the unexpectedly enhanced rate of polymerization obtained by the process of the present invention (Experiment 1) as compared to the disclosed alternate methods of preparing the catalysts while in the presence of vinyl chloride monomer (Experiments 2-7 inclusive), as well as where the individual catalyst components are simultaneously added to vinyl chloride monomer (Experiment 10). Further, Experiments 11-13 inclusive, illustrate the effect of pre-mixing all of the catalyst components prior to admixture with the vinyl chloride monomer. These experiments also illustrate the effect of reaction temperature on the polymerization rate. In this regard, it is to be noted, as would be expected, that the polymerization rate increases with an increase in reaction temperature. Such factor is pertinent, however, in considering the data set forth herein wherein Experiment 1 (the invention) was conducted at a reaction temperature of 30° C. and still provides significantly enhanced reaction rates as contrasted to the comparative experiments which utilized reaction temperatures of up to 50° C.

In the preparation of the vinyl chloride polymers in accordance with the present invention, the transition metal compound constituent of the catalyst system may be any inorganic or organic salt or complex of the metals of Groups II-B, IV-A, IV-B, V-B, VI-B, VII-B or VIII (including thorium and uranium) of the Periodic Table of Deming, "Fundamental Chemistry," second edition, published 1952 by John Wiley and Sons, Inc., N.Y. Thus, any compound of cadmium, zinc, tin, lead, titanium, zirconium, hafnium, thorium, vanadium, tantalum chromium, molybdenum, tungsten, uranium, manganese, rhenium, iron or cobalt may be used. As purely exemplary of such compounds are cadmium chloride, zinc chloride, stannic chloride, lead nitrate, titanium tetrachloride, zirconium tetrachloride, titanium trichloride, vanadium dichloride, bis(cyclopentadienyl) titanium dichloride, vanadium trichloride, vanadium trichloride, vanadium tetrachloride, vanadium trifluoride, vanadium oxytrichloride, vanadium oxydichloride, tantalum pentachloride, molybdenum trichloride, molybdenum pentachloride, chromium dichloride, chromium trichloride, ferric chloride, manganese dichloride, vanadium trioxide, vanadium pentoxide, chromium oxide, vanadium oxyacetylacetonate, chromium acetylacetonate, cobalt acetylacetonate, iron acetylacetonate, manganese acetylacetonate, alkyl vanadates alkyl titanates, among many others.

TABLE I

| Experiment number | Group No. | Order of mixing catalyst | | |
|---|---|---|---|---|
| | | 1st bottle | 2nd bottle | 3rd group |
| 1 (the invention) | I | TiCl₄ + VCl | ATE + THF + VCl | |
| 2 (for comparison) | I | TiCl₄ + ATE + VCl | THF + VCl | |
| 3 (for comparison) | I | THF + TiCl₄ + VCl | ATE + VCl | |
| 4 (for comparison) | I | THF + TiCl₄ + VCl | THF + ATE + VCl | |
| 5 (for comparison) | I | THF + ATE + VCl | ATE + TiCl₄ + VCl | |
| 6 (for comparison) | I | TiCl₄ + THF + VCl | ATE + TiCl₄ + VCl | |
| 7 (for comparison) | I | ATE + VCl | TiCl₄ + VC. | THF + VCl |
| 8 (for comparison) | I | THF + VCl | TiCl₄ + VCl | ATE + VCl |
| 9 (for comparison) | I | ATE + VCl | THF + VCl | TiCl₄ + VCl |
| 10 (for comparison) | II | ATE + TiCl₄ + THF + VCl | | |
| 11–13 (for comparison) | III | ATE + TiCl₃ + THF | VCl | |

| Experiment number | Polym. rate, percent conv./hr. | Polym. time, hr. | Molecular weight | Temp., °C. | Cat. conc., p.p.m. Ti |
|---|---|---|---|---|---|
| 1 | 1.52 | 2¾ | 25,000 | 30 | 200 |
| 2 | 0.0111 | 18 | 26,000 | 30 | 200 |
| 3 | 0.0222 | 18 | | 30 | 200 |
| 4 | 0.895 | 4¾ | 26,000 | 40 | 200 |
| 5 | 0.21 | 4¾ | 35,000 | 40 | 200 |
| 6 | 0.132 | 20¾ | 54,500 | 40 | 200 |
| 7 | 0.0119 | 21 | | 50 | 200 |
| 8 | 0.0119 | 21 | | 50 | 200 |
| 9 | 0.0119 | 21 | | 50 | 200 |
| 10 | 1.18 | 17 | 24,000 | 50 | 200 |
| 11 | 0.0244 | 41 | | 30 | 50 |
| 12 | 0.157 | 33 | | 40 | 50 |
| 13 | 0.375 | 16 | | 50 | 50 |

The above described compounds of metals of Groups II–B, IV–A, IV–B, V–B, VI–B, VII–B and VIII (including thorium and uranium) are used in amounts sufficient to provide at least about 1 p.p.m., and preferably less than 1000 p.p.m. of the indicated metal constituent of such compound, based on the weight of the vinyl chloride monomer. More particularly, such compounds are unexpectedly economically and advantageously used in amounts sufficient to provide about 200 p.p.m. or as low as between about 10 and 20 p.p.m. of the metal constituent of such compound, based on the weight of the monomer. It has been found that catalyst systems containing less than about 1 p.p.m. of such metals, when used in conjunction with the total catalyst system as defined herein, do not effectively produce polymer, particularly if the materials to be polymerized are not substantially dry prior to mixture therewith. It has further been found that concentrations of the metal constituent of the above defined compounds in excess of about 1000 p.p.m., based on the weight of the monomeric materials, tend to produce polymer which is often dark and which is difficultly separated from residual undesirable catalyst materials.

The organometallic constituent of the catalyst may be any organometallic compound of a metal of Groups I, II, or III of the Periodic System, i.e., an alkali metal, alkaline-earth metal, zinc, or aluminum, may be used. Exemplary of such organometallic compounds are the alkali metal alkyls or aryls such as butyllithium, amylsodium, phenylsodium, etc., dimethyl magnesium, diethyl magnesium, diethyl zinc, butyl magnesium chloride, ethyl magnesium chloride, phenyl magnesium bromide, trimethylaluminum, triethylaluminum, tripropylaluminum, tributylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diisobutylaluminum chloride, diethylaluminum hydride, ethylaluminum hydride, diisobutylaluminum hydride, etc., and complexes of such organometallic compounds, as for example, sodium aluminum tetraethyl, lithium aluminum triethyl butyl, lithium aluminum trioctyl butyl, lithium aluminum tetraoctyl, sodium aluminum triethyl chloride, etc.

The molar ratios of the organometallic compound to the metals of Groups II–B, IV–A, IV–B, V–B, VI–B, VII–B or VIII of the Periodic System may be varied between about 0.5 and 10 moles of the herein defined organometallic compound per mole of the above-identified metal compounds. Molar ratios less than those stated herein are generally not sufficient for reaction and molar ratios in excess of those stated herein often result in a disadvantageously slow rate of polymerization.

Suitable complexing agents, which are believed to function as electron donors to form chelate-type complexes with the organometallic compound, are ethers, alkylene oxides, tertiary amines, esters, ketones and nitro aromatics. Exemplary of the complexing agents that are particularly effective are ethers such as diethyl ether, tetrahydrofuran, 2-methyltetrahydrofuran, triethyl amine, ethylene oxide and ethyl acetate. Just what may be the function of the complexing agent is not completely understood but it is believed that it forms a complex with the organometallic compound to prevent undesirable side reactions which might otherwise take place between the organometallic compound and the monomer or polymer. The molar ratios of the complexing agent to the compounds of the metals of Groups II–B, IV–A, IV–B, V–B, VI–B, VII–B and VIII of the Periodic System may be varied between about 1.5 and 30 moles of such complexing agent per mole of the indicated compounds. Molar ratios less than those defined herein are generally insufficient for polymerization and molar ratios in excess of those stated herein are unnecessary and may substantially retard polymerization rates.

The selection of the temperature used for the polymerization process will obviously depend upon the activity of the catalyst system used and the degree of polymerization desired. In general, the polymerization will be carried out at temperatures between about 10° C. and 150° C., and preferably between about 35° C. and 70° C. Further while autogenous pressures are generally used, the polymerization may be carried out under a wide range of pressures, as for example, from a partial vacuum up to as much as about 1000 pounds. Higher pressures may of course, be used but generally do not appreciably alter the course of the polymerization.

The vinyl chloride polymers produced in accordance with the present invention are highly porous, essentially non-crystalline materials having relatively low bulk density (i.e. from about 0.1 to 0.2 gram per milliliter) particles having a diameter as small as 1 to 2 microns and significantly improved resistance to heat. Hence such polymers have a wide range of application as coatings, film, flexible articles such as floor covering, and rigid and semirigid articles such as pipe and bottles, among many others.

What is claimed is:
1. In a method of preparing polyvinyl chloride in the presence of a catalyst formed by reaction of:
(1) A salt of a metal selected from the group consisting of metals of the Groups II–B, IV–A, IV–B, V–B,

VI–B, VII–B and VIII of the Periodic System with (2) an organometallic compound of a metal selected from the group consisting of an alkali metal, an alkaline-earth metal, zinc and aluminum, and (3) a complexing agent for said organometallic compound selected from the group consisting of ethers, alkylene oxides, tertiary amines, esters, ketones and nitro aromatics wherein the metal constituent of (1) is present in amounts of at least 1 p.p.m. based on the weight of vinyl chloride, wherein (2) is present in amounts between about 0.5 and 10 moles per mole of (1) and wherein (3) is present in amounts between about 1.5 and 30 moles per mole of (1) the improvement consisting of: first separating the vinyl chloride into two essentially equal portions (a) and (b) then admixing (1) with (a) and admixing (2) and (3) with (b) and then admixing (a) and (b) and polymerizing the admixture of (a) and (b) essentially to completion at a temperature between about 10° C. and 150° C.

2. The method of claim 1 wherein said polymerization is conducted in the absence of additional solvents and diluents.

3. The method of claim 1 wherein (1) is titanium tetrachloride, (2) is triethylaluminum and (3) is tetrahydrofuran.

References Cited

UNITED STATES PATENTS 3,422,082  1/1969  Vandenberg _____ 260—92.8

MURRAY TILLMAN, Primary Examiner

W. J. BRIGGS, SR., Assistant Examiner

U.S. Cl. X.R.

260—2.5 R